United States Patent [19]
Vodila et al.

[11] Patent Number: 5,634,484
[45] Date of Patent: Jun. 3, 1997

[54] DEVICE AND METHOD FOR REMOTELY VENTING A CONTAINER

[75] Inventors: James M. Vodila, North Huntingdon, Pa.; Jeffrey A. Bergersen, Idaho Falls, Id.

[73] Assignee: The United States of America as represented by the Department of Energy, Washington, D.C.

[21] Appl. No.: 388,668

[22] Filed: Feb. 16, 1995

[51] Int. Cl.[6] .............................. H16K 31/53; B67B 7/18; B67B 7/42
[52] U.S. Cl. .............................. 137/15; 81/3.31; 81/3.33; 81/3.37; 137/315; 137/319; 251/249.5
[58] Field of Search .............................. 137/15, 315, 319, 137/320, 321, 322, 323; 251/248, 249.5; 81/3.2, 3.29, 3.31, 3.33, 3.36, 3.37, 3.43

[56] References Cited

U.S. PATENT DOCUMENTS

| | | | |
|---|---|---|---|
| 814,641 | 3/1906 | Coomber | 81/3.33 |
| 1,328,980 | 1/1920 | Benjamin | 137/319 |
| 1,483,964 | 2/1924 | Abramovitz | 137/319 |
| 2,162,445 | 6/1939 | Richel | 81/3.33 |
| 2,186,925 | 1/1940 | Hooper et al. | 137/321 |
| 2,187,838 | 1/1940 | Penick et al. | 137/319 |
| 2,320,042 | 5/1943 | McMahan | 137/319 |
| 2,897,699 | 8/1959 | Anderson, Jr. | 81/3.33 |
| 3,795,158 | 3/1974 | Morita | 81/3.32 |
| 4,102,226 | 7/1978 | McGuire | 81/3.33 |
| 4,171,650 | 10/1979 | Cardinal | 81/3.32 |
| 4,420,012 | 12/1983 | Astrom | 137/319 |
| 4,432,387 | 2/1984 | Sims | 251/249.5 |
| 4,762,029 | 8/1988 | Chen | 81/3.32 |
| 4,899,780 | 2/1990 | Astrom | 137/319 |
| 5,003,844 | 4/1991 | Barrow | 81/3.33 |
| 5,040,437 | 8/1991 | Mueller | 81/3.32 |
| 5,203,236 | 4/1993 | Anderson | 81/3.2 |

*Primary Examiner*—George L. Walton
*Attorney, Agent, or Firm*—John T. Lucas; William R. Moser; Paul A. Gottlieb

[57] ABSTRACT

A device for venting a container having a bung includes a saddle assembly securable to a container and having a support extending therefrom. A first arm is rotatably secured to the support, and the first arm extends in a first direction. A second arm has a first end portion drivingly engaged with the first arm, so that rotation of the first arm causes rotation of the second arm. A second end portion of the first arm is positionable proximate the bung of the container. A socket is operably associated and rotatable with the second end portion and is drivingly engageable with the bung, so that rotation of the socket causes corresponding rotation of the bung for thereby venting the container.

20 Claims, 1 Drawing Sheet

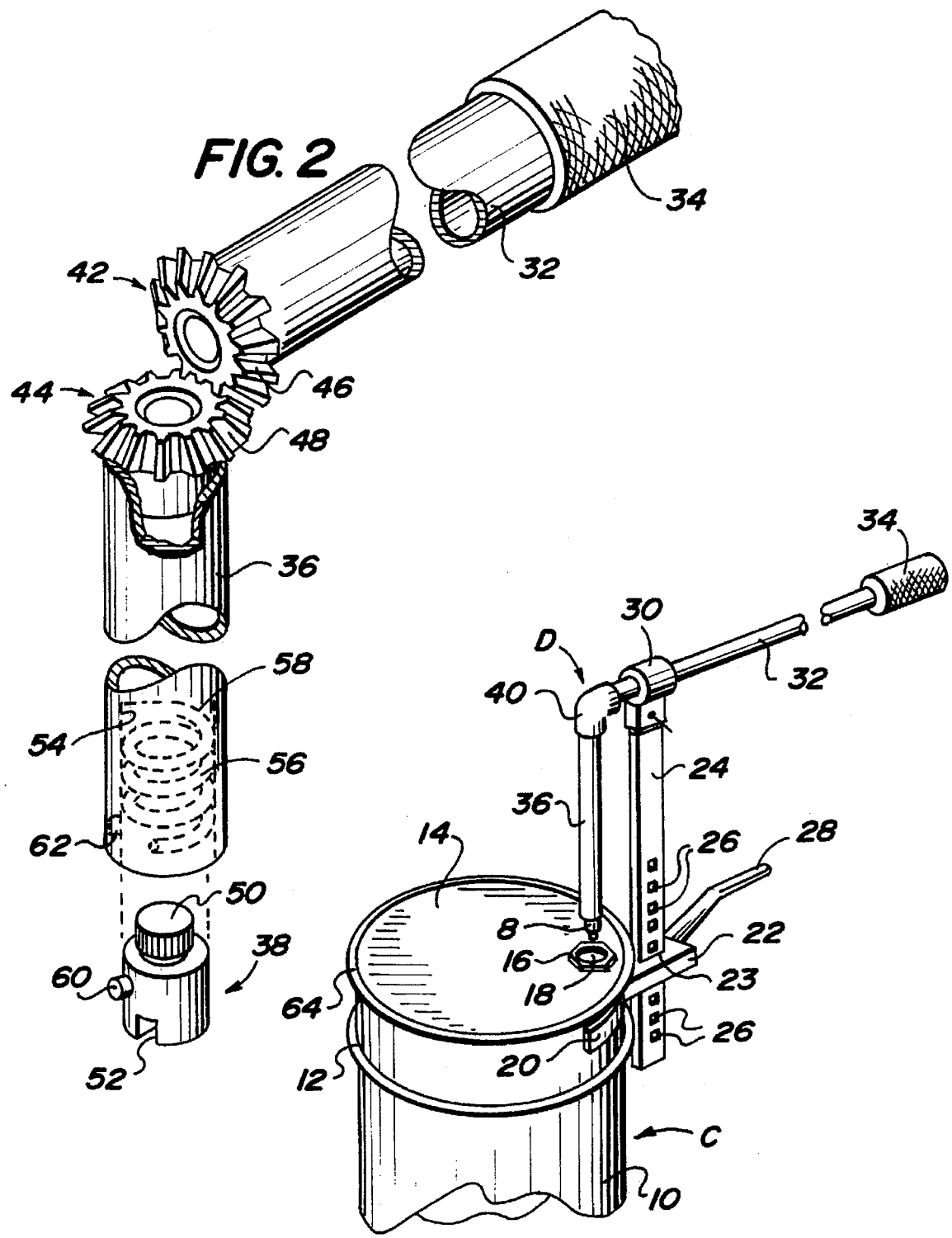

DEVICE AND METHOD FOR REMOTELY VENTING A CONTAINER

FIELD OF THE INVENTION

The disclosed invention is to a device and method for venting containers. More specifically, the invention is a portable assembly securable to a drum having a screw threaded bung, with the assembly capable of being remotely operated to loosen the bung and thereby vent the container to prevent container rupture.

BACKGROUND OF THE INVENTION

Numerous incidents of fire, explosion, and ground contamination have occurred at various facilities over the last several years due to drum rupture on account of overpressurization. These incidents frequently are caused by an ignition source or a reaction between incompatible materials. The incidents may also occur simply as a result of climatic changes causing the drum to be over pressurized, such as may occur should the drum be exposed to strong sunlight. Volatile wastes stored in an area subject to high temperatures may result in a pressure build-up, with that build up sometimes being sufficient to cause the drum to burst or rupture. The drums frequently contain hazardous liquid wastes, with the result that the rupture causes the waste material to contaminate the surrounding environs.

The increase of gases and vapors in a drum may sometimes be identified due to bulging or deformation prior to the build-up reaching a level sufficient to cause a violent release of the material. Because the build-up may be ascertained externally prior to rupture, then venting of the container is one means for minimizing the possibility of drum rupture. Should the drum not be vented or the quantity of material otherwise reduced prior to rupture, then a sudden release of the material to the environment may occur and cause damage to equipment and personnel, and result in extensive clean-up operations.

Those skilled in the art will recognize that there is a need for a device permitting drum containers containing hazardous materials to be vented prior to the pressure therein having built to a level sufficient to rupture the drum. The disclosed invention is an article of manufacture designed to release pressure within accumulation and shipping containers due to the generation of gases and vapors resulting from corrosion, decomposition and climate changes. The device permits the pressure within the container to be gradually released while being remotely operated, thus reducing the risk of injury to personnel on account of fire, explosion, or harmful vapors.

OBJECTS AND SUMMARY OF THE INVENTION

A device for venting a container having a bung includes a saddle assembly securable to the container. A support is carried by the saddle assembly, and extends therefrom. A first arm is rotatably secured to the support, and the first arm extends in a first direction. A second arm has a first end portion drivingly engaged with the first arm, so that rotation of the first arm causes corresponding rotation of the second arm. The second arm has a second end portion positionable proximate the bung of the container. A socket is operably associated and rotatable with the second end portion of the second arm. The socket is drivingly engageable with the bung, so that rotation of the socket causes corresponding rotation of the bung for thereby venting the container.

A remote venting device and container comprises a drum container having a threaded bung secured in a threaded opening of the container. A saddle assembly is secured to the container. A support is carried by the saddle assembly and extends therefrom. A first arm is rotatably secured to the support and extends in a first direction. A second arm extends in a second direction, and has a first end portion drivingly engaged with the first arm, so that rotation of the first arm causes corresponding rotation of the second arm. A socket extends from a second end portion of the second arm and is drivingly engaged with the bung, so that rotation of the second arm by the first arm causes associated rotation of the bung.

A method of venting a container having a bung comprises the steps of providing a venting device securable to a container, the device comprising a support, a first arm rotatably secured to the support and extending in a first direction, a second arm extending in a second direction and having a first end portion drivingly engaged with the first arm so that rotation of the first arm causes rotation of the second arm, and a second end portion from which a socket extends. A container having a threaded bung securing a threaded opening therein is provided. The venting device is secured to the container, and the socket is engaged with the bung. The first arm is then rotated for causing associated rotation of the socket. The bung is thus caused to rotate within the opening, so that the container may be vented.

These and other objects and advantages of the invention will be readily apparent in view of the following description and drawings of the above-described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is a fragmentary perspective view of the venting device of the invention secured to a container; and FIG. 2 is fragmentary exploded assembly drawing of the venting device of the invention.

DETAILED DESCRIPTION OF THE INVENTION

Container C, as best shown in FIG. 1, is a steel drum having a side wall 10, reinforcing rib 12, and a top 14 secured to side wall 10 by welding or other means assuring a liquid-tight connection between the steel top 14 and the side wall 10. Those skilled in the art will understand that container C also has a bottom (not shown) closing the lower end thereof, and likewise providing a liquid-tight connection. Top 14 has a connector 16 secured thereto and through which a threaded opening extends, in order to permit the interior of container C to be accessed for filling and emptying. Connector 16 likewise has a liquid connection with top 14, in order to permit container C to be sealed for shipment, storage, and the like. The opening in connector C is stopped or plugged by a threaded bung 18. Bung 18, like container C, preferably is made from coated steel or other resistant material in order to withstand the materials contained within container C. The container C may contain hazardous liquid materials, the release of which is to be prevented.

Venting device D, as best shown in FIG. 1, includes a drum saddle 20 of arcuate configuration which extends about a substantial portion of the periphery of container C, with the drum saddle 20 having a configuration substantially conforming to the configuration of sidewall 10. Drum arm 22 is secured to drum saddle 20 and extends therefrom away from container C. Drum arm 22 has a slot or opening 23 therethrough in which locking arm 24 is received. Locking arm 24 is slidable relative to drum arm 22. Locking arm 24 has a plurality of longitudinally spaced openings 26 therethrough which are engageable with ratchet bar 28. Operation of ratchet bar 28 causes locking arm 24 to slide within opening 23 through sequential engagement of openings 26.

Bracket 30 is secured to the upper end of locking arm 24 and has an opening therethrough. Extension arm 32 has a portion rotatably secured within the opening of bracket 30, and a remote portion to which handle 34 is attached. Extension or first arm 32 may be extensible in order to position the handle 34 a sufficiently remote distance from container C for safe use of the device D so that venting of container C through the opening in connector 16 may occur. Arm 32 preferably is formed of rigid fiberglass or metal.

Extension arm 32 is drivingly engaged with socket arm 36. Socket arm 36 extends parallel to locking arm 24, while extension arm 32 extends generally perpendicular to locking arm 24. Socket arm 36 is thus at a right angle to extension arm 32. Socket 38 is secured to the lower end of socket or second arm 36 and is engageable with bung 18. Preferably housing 40 covers the rotary joint by which extension arm 32 and socket arm 36 are drivingly engaged.

Miter gear 42, as best shown in FIG. 2, is secured to the distal end of extension arm 32 and is rotatable with the arm. Miter gear 42 is meshingly engaged with miter gear 44, and is secured to and rotatable with the distal end of socket arm 36 remote from socket 38. Gears 42 and 44 each have a frustoconical portion 46 and 48, respectively, in which a plurality of teeth are cut in order to provide the gearing. Preferably the frustoconical portions 46 and 48 extend at a pressure angle of 20° relative to the axis about which the respective gears rotate. Because the gears 42 and 44 are meshingly engaged and are secured to their respective arms, then rotation of handle 34 causes rotation of gear 42, with associated rotation of gear 44, socket arm 36, and socket 38. Because handle 34 may be rotated in both the clockwise and counterclockwise directions, then socket 38 may be correspondingly rotated.

Socket 38 preferably is reversible and has a male portion 50 at one end, and a slotted female portion 52 at the opposite end. Because the socket 38 is reversible, then it may be used for engaging and rotating bungs 18 of essentially any configuration. Those skilled in the art recognize that the female portion 52 would be used for a bung having a bar extending thereacross, while the male portion 50 would be used for a bung having a circular slot therein. Socket 38 is preferably formed from a non-sparking metal.

The socket arm 36 preferably has a hollow lower portion 54 in which coil spring 56 is positioned. Spring 56 has a first end resting upon closed wall 58, with the opposite end of spring 56 bearing upon socket 38 for biasing socket 38 longitudinally outwardly. Socket 38 preferably has a spring-loaded ball 60 receivable within detent 62 of lower portion 54 for preventing rotation of socket arm 36 relative to socket 38 as bung 18 is being rotated.

Operation of the device D for rotating a bung 18 in order to vent and thereafter seal a container C is relatively simple, and yet may be done in a manner minimizing the possibility of harm to the user. The device D is lightweight and portable, because the components are preferably made of rigid fiberglass and/or non-sparking metal. Because the device D is portable, then it minimizes the need to move container C during installation and use of the device. Movement of overpressurized drums can substantially increase the possibility of fire or explosion. Because the device D does not rely on drilling or puncturing the container C, then the integrity of the container C may be maintained. Drilling or puncturing the container could result in an uncontrolled release of the material and/or a sudden breach of the container. The device D, because the rotation of the bung 18 may be controlled, permits depressurization to be controlled so that the pressure is slowly released. Once depressurized, then the bung 18 may again be sealed to connector 16.

In use, the drum saddle 20 is brought to bear against the side wall 10 of the container C, with the drum arm 22 being positioned directly under the lip 64. The socket 38 is aligned with the bung 18, and the ratchet bar 28 operated in order to draw the locking arm 24 into position so that the socket 38 engages the bung 18. Because locking arm 24 supports socket arm 36, then movement of locking arm 24 within opening 23 causes corresponding movement of socket arm 36. Operation of the ratchet bar 28 causes the device D to be clamped and secured in place to the container C.

Once the device D has been securely clamped to the container C, then the operator rotates the handle 34 in order to cause the extension arm 32 to rotate about its axis. Because of the miter gears 42 and 44, then rotation of extension arm 32 causes associated rotation of socket arm 36 and the socket 38. Rotation of socket 38 causes corresponding rotation of bung 18. Bung 18 will normally be rotated relatively slowly, so that a gradual depressurization of the container C occurs. Sudden release of pressure is prevented because the drum arm 22 is secured under the drum lip 64, and the socket arm 36 substantially prevents sudden or substantial movement of the bung 18 in a vertical direction. Even should material within the container C be suddenly released, then such release will be confined to a relatively small area and likely will not result in a violent and uncontrolled release. Because the handle 34 is at a substantial distance from bung 18, then the possibility of operator injury is substantially reduced. Once the pressure in container C has been vented, then handle 34 is rotated in the opposite direction in order to seal bung 18 to connector 16.

While this invention has been described as having a preferred design, it is understood that it is capable of further modifications, uses, and/or adaptations of the invention, following in general the principle of the invention and including such departures from the present disclosure as come within known or customary practice in the art to which the invention pertains, and as may be applied to the central features hereinbefore set forth, and fall within the scope of the invention of the limits of the appended claims.

What we claim is:

1. A device for venting a container having a bung, comprising:

a) a "removable single saddle assembly unit" securable to a container having a bung "said saddle assembly unit is capable of being positioned along various locations on said container to enable rotation of said bung";

b) a support arm carried by said saddle assembly unit and extending therefrom "said support arm being slidable movable with respect to the saddle assembly unit and securing said saddle assembly unit at different locations along said container";

c) a first arm rotatably secured to said support arm, said first arm extending in a first direction;

d) a second arm having a first end portion drivingly engaged with said first arm, so that rotation of said first arm causes associated rotation of said second arm, and a second end portion positionable proximate the bung of the container; and e) a socket operably associated and rotatable with said second end portion and drivingly engageable with the bung so that rotation of said socket causes corresponding rotation of the bung for venting the container.

2. The device of claim 1, wherein:

a) said second arm extends at an angle to said first arm.

3. The device of claim 2, wherein:

a) said second arm extends generally perpendicularly to said first arm.

4. The device of claim 1, wherein:

a) said first arm has a first gear at a first end portion thereof; and b) said second arm has a second gear meshingly engaged with said first gear for thereby drivingly engaging said arms.

5. The device of claim 4, wherein:

a) each of said gears is a miter gear.

6. The device of claim 5, wherein:

a) each of said miter gears has a frustoconical portion extending about its axis of rotation.

7. The device of claim 6, wherein:

a) each frustoconical portion has a plurality of teeth disposed thereabout, and the teeth are meshingly engaged.

8. The device of claim 4, wherein:

a) a housing is mounted about said gears.

9. The device of claim 4, wherein:

a) said first arm has a second end portion remote from said first arm first end portion; and b) a handle is formed about said first arm second end portion for permitting manual rotation of said first arm.

10. The device of claim 1, wherein:

a) said socket is releasably secured to said second end portion.

11. The device of claim 10, wherein:

a) means are operably associated with said second end portion and engaged with said socket for biasing said socket.

12. The device of claim 11, wherein:

a) said second arm has a hollow portion at said second end portion; and b) said biasing means are positioned within said hollow portion.

13. The device of claim 12, wherein:

a) said biasing means is a spring.

14. The device of claim 10, wherein:

a) a spring-loaded ball is carried by said socket for releasably securing said socket to said second end portion.

15. The device of claim 10, wherein:

a) said socket has a male portion and a female portion, and said socket is reversible for selectively exposing one of said male and female portion.

16. The device of claim 1, wherein said saddle assembly includes:

a) a saddle conforming to the configuration of the container;

b) a drum arm secured to said saddle and extending therefrom;

c) means receiving said support for thereby permitting said first arm to be positioned relative to the container; and d) means securing said support to said drum arm.

17. The device of claim 16, where said securing means includes:

a) a plurality of openings formed in said support; and b) a ratchet bar carried by said drum arm and cooperating with said openings.

18. The device of claim 1, wherein:

a) said socket is formed from a non-sparking metal; and b) said first arm is formed from one of rigid fiberglass and metal.

19. A remote venting device and container, comprising:

a) a drum container having a threaded bung secured within a threaded opening of said container; and b) a "removable single saddle assembly unit" secured to said container, "said saddle assembly unit is capable of being positioned along various locations on said container to enable removal of said bung" a support arm carried by said saddle assembly unit and extending therefrom "said support arm being slidably movable with respect to the saddle assembly unit and securing said saddle assembly unit at different locations along said container", a first arm rotatably secured to said support and extending in a first direction, a second arm support extending in a second direction and having a first end portion drivingly engaged with said first arm so that rotation of said first arm causes corresponding rotation of said second arm, and a socket extending from a second end portion of said second arm and drivingly engaged with said bung so that rotation of said second arm by said first arm causes associated rotation of said bung for thereby venting the container.

20. The method of venting a container having a bung, comprising:

a) providing a venting device securable to a container "said venting device is capable of being positioned along various locations on said container to enable removal of said bung" and the device comprising a support, a first arm rotatably secured to the support and extending in a first direction, a second arm extending in a second direction and having a first end portion drivingly engaged with said first arm so that rotation of the first arm causes corresponding rotation of the second arm, and a second end portion from which a socket extends;

b) providing a container having a threaded bung secured within a threaded opening in the container;

c) securing the venting device to the container and engaging the socket with the bung; and d) rotating the first arm and thereby causing associated rotation of the socket and the bung so that the bung rotates within the opening and vents the container.

* * * * *

UNITED STATES PATENT AND TRADEMARK OFFICE
CERTIFICATE OF CORRECTION

PATENT NO. : 5,634,484

DATED : June 3, 1997

INVENTOR(S) : Vodila et al.

It is certified that error appears in the above-indentified patent and that said Letters Patent is hereby corrected as shown below:

In claim 1a) and b),col.4, lines 57,58,60,62,65, delete all occurrences of quotation marks.
In claim 19 b), col. 6, lines 24,25,27,29,32, delete all occurrences of quotation marks
In claim 20 a), col. 6, lines 45,47 delete all occurrences of quotation marks.

Signed and Sealed this

Twenty-first Day of July, 1998

Attest:

BRUCE LEHMAN

Attesting Officer     Commissioner of Patents and Trademarks